(12) United States Patent
Delahaye et al.

(10) Patent No.: US 9,799,908 B2
(45) Date of Patent: Oct. 24, 2017

(54) METHOD OF PREPARING AN ELECTROCHEMICAL HALF-CELL

(75) Inventors: Thibaud Delahaye, Tresques (FR); Mathilde Rieu, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 493 days.

(21) Appl. No.: 14/112,341

(22) PCT Filed: Apr. 19, 2012

(86) PCT No.: PCT/EP2012/057117
§ 371 (c)(1),
(2), (4) Date: May 27, 2014

(87) PCT Pub. No.: WO2012/143417
PCT Pub. Date: Oct. 26, 2012

(65) Prior Publication Data
US 2014/0255599 A1  Sep. 11, 2014

(30) Foreign Application Priority Data
Apr. 22, 2011 (FR) .................................. 11 53522

(51) Int. Cl.
| | | |
|---|---|---|
| B05D 5/12 | (2006.01) | |
| H01M 8/1097 | (2016.01) | |
| C04B 35/01 | (2006.01) | |
| C04B 35/16 | (2006.01) | |
| C04B 35/486 | (2006.01) | |
| C04B 35/624 | (2006.01) | |
| C04B 35/626 | (2006.01) | |
| C04B 35/632 | (2006.01) | |
| C25B 11/04 | (2006.01) | |
| H01M 4/86 | (2006.01) | |
| H01M 4/88 | (2006.01) | |
| H01M 4/90 | (2006.01) | |
| H01M 8/1213 | (2016.01) | |
| H01M 8/124 | (2016.01) | |

(52) U.S. Cl.
CPC ........... *H01M 8/1097* (2013.01); *C04B 35/01* (2013.01); *C04B 35/16* (2013.01); *C04B 35/486* (2013.01); *C04B 35/624* (2013.01); *C04B 35/6263* (2013.01); *C04B 35/6325* (2013.01); *C25B 11/04* (2013.01); *H01M 4/8621* (2013.01); *H01M 4/8828* (2013.01); *H01M 4/8889* (2013.01); *C04B 2235/3224* (2013.01); *C04B 2235/3225* (2013.01); *C04B 2235/3246* (2013.01); *C04B 2235/3279* (2013.01); *C04B 2235/3287* (2013.01); *C04B 2235/441* (2013.01); *C04B 2235/443* (2013.01); *C04B 2235/6562* (2013.01); *C04B 2235/6565* (2013.01); *C04B 2235/6567* (2013.01); *H01M 4/9033* (2013.01); *H01M 4/9066* (2013.01); *H01M 8/1213* (2013.01); *H01M 2008/1293* (2013.01); *H01M 2300/0077* (2013.01); *Y02E 60/366* (2013.01)

(58) Field of Classification Search
USPC .......................................................... 427/77
See application file for complete search history.

(56) References Cited

U.S. PATENT DOCUMENTS

| | | | |
|---|---|---|---|
| 3,330,697 A | 7/1967 | Pechina | |
| 5,037,525 A | 8/1991 | Badwal | |
| 5,509,189 A * | 4/1996 | Tuller | B01D 53/326 117/103 |
| 8,500,971 B2 | 8/2013 | Le Gallo et al. | |
| 2003/0003237 A1 | 1/2003 | Seabaugh et al. | |
| 2003/0021900 A1 | 1/2003 | Jacobson et al. | |
| 2003/0082434 A1* | 5/2003 | Wang | H01M 4/8621 429/469 |
| 2006/0049540 A1* | 3/2006 | Hui | B82Y 30/00 264/140 |
| 2006/0257703 A1* | 11/2006 | Qi | H01M 8/0276 429/495 |
| 2006/0280998 A1 | 12/2006 | Ying et al. | |
| 2007/0054169 A1* | 3/2007 | Day | H01M 4/9033 429/482 |
| 2007/0235325 A1 | 10/2007 | Kamachi et al. | |
| 2008/0057356 A1* | 3/2008 | Shimomura | H01M 4/8605 429/495 |

(Continued)

FOREIGN PATENT DOCUMENTS

| | | |
|---|---|---|
| EP | 2083465 A1 | 7/2009 |
| FR | 2916653 A1 | 12/2008 |
| WO | 03036739 A2 | 5/2003 |

OTHER PUBLICATIONS

Bernay, C., et al., "Yttria-doped zirconia thin films deposited by atomic layer deposition ALD: a structural, morphological and electrical characterisation", "Journal of Physics and Chemistry of Solids", May 28, 2003, pp. 1761-1770, vol. 64.

Chesnaud, A., et al., "Cuspidine-Like Compounds Ln4[Ga2(1-x)Ge2xO7+x 1-x]O2 (Ln=La, Nd, Gd; x less than or equal to 0.4)", "Chem. Mater.", Nov. 12, 2004, pp. 5372-5379, vol. 16

De Souza, S., et al., "Thin-film solid oxide fuel cell with high performance at low-temperature", "Solid State Ionics", Jan. 1997, pp. 57-61, vol. 98.

Ding, J., et al., "An anode-supported solid oxide fuel cell with spray-coated yttria-stabilized zirconia (YSZ) electrolyte film", "Solid State Ionics", Sep. 15, 2008, pp. 1246-1249, vol. 179.

(Continued)

*Primary Examiner* — Austin Murata
(74) *Attorney, Agent, or Firm* — Hultquist, PLLC; Mary B. Grant (57) ABSTRACT

The present invention relates to a method for preparing an electrode-supported electrochemical half-cell including a step consisting in subjecting a green electrode layer on which a precursor gel of the electrolyte or a precursor thereof is deposited to sintering at a temperature of less than or equal to 1350° C.

20 Claims, 2 Drawing Sheets

(56) References Cited

U.S. PATENT DOCUMENTS

| | | | |
|---|---|---|---|
| 2009/0181278 A1* | 7/2009 | Son | C25D 11/24 |
| | | | 429/528 |
| 2009/0208746 A1* | 8/2009 | Suciu | B82Y 30/00 |
| | | | 428/402 |
| 2010/0143824 A1* | 6/2010 | Tucker | H01M 4/8657 |
| | | | 429/483 |
| 2010/0196767 A1 | 8/2010 | Sala et al. | |
| 2011/0229786 A1 | 9/2011 | Di Iorio et al. | |
| 2011/0253548 A1 | 10/2011 | Di Iorio et al. | |
| 2012/0186976 A1 | 7/2012 | Laucournet et al. | |
| 2013/0043123 A1 | 2/2013 | Reytier et al. | |
| 2013/0284591 A1 | 10/2013 | Delahaye et al. | |
| 2014/0017592 A1 | 1/2014 | Delahaye et al. | |
| 2014/0197557 A1 | 7/2014 | Picart et al. | |

OTHER PUBLICATIONS

Dollen, P., et al., "A Study of Screen Printed Yttria-Stabilized Zirconia Layers for Solid Oxide Fuel Cells", "Journal of the American Ceramic Society", Sep. 21, 2005, pp. 3361-3368, vol. 88, No. 12.

Doshi, R., et al., "Development of SolidOxide Fuel Cells That Operate at 500C.", "Journal of the Electrochemical Society", Apr. 1999, pp. 1273-1278, vol. 146, No. 4.

Ferchaud, C., et al., "High performance praseodymium nickelate oxide cathode for low temperature solid oxide fuel cell", "Journal of Power Sources", Sep. 22, 2010, pp. 1872-1879, vol. 196.

Hansch, R., et al., "Screen printing of solgel-derived electrolytes for solid oxide fuel cell (SOFC) application", "Ceramics International", Jul. 4, 2008, pp. 803-811, vol. 35.

Hosomi, T., et al., "Electrophoretic deposition for fabrication of YSZ electrolyte film on non-conducting porous NiOYSZ composite substrate for intermediate temperature SOFC", "Journal of the European Ceramic Society", Jun. 14, 2006, pp. 173-178, vol. 27.

Huang, X., et al., "Preparation and characteristics of Pr1.6Sr0.4NiO4+YSZ as composite chathode of solid oxide fuel cells", "Journal of Physics and Chemistry of Solids", Mar.-Apr. 2009, pp. 665-668, vol. 70.

Ihringer, R., et al., "Development of thin film electrolytes co-fired with NIO-YSZ substrates", "Solid Oxide Fuel Cells V", Apr. 1997, pp. 340-347, vol. 18, Publisher: The Electrochemical Society, Inc., Published in: Pennington, New Jersey.

Kim, J., et al., "Characterization of LSM-YSZ composite electrode by ac impedance spectroscopy", "Solid State Ionics", Jul. 2001, pp. 379-389, vol. 143.

Kokkofitis, C., et al., "High temperature proton conductors: Applications in catalytic processes", "Solid State Ionics", Apr. 2007, pp. 507-513, vol. 178.

Leng, Y., et al., "Performance evaluation of anode-supported solid oxide fuel cells with thin Im YSZ electrolyte", "International Journal of Hydrogen Energy", Aug. 2004, pp. 1025-1033, vol. 29.

Lenormand, P., et al., "Thick films of YSZ electrolytes by dip-coating process", "Journal of the European Ceramic Society", Apr. 6, 2005, pp. 2643-2646, vol. 25.

Liang, M., et al., "Preparation of NiOYSZ composite powder by a combustion method and its application for cathode of SOEC", "International Journal of Hydrogen Energy", Jun. 12, 2009, pp. 2852-2857, vol. 35.

Magrez, A., et al., "A new 'Chimie Douce' approach to the synthesis of Sr1-xLa1+xAl1-xMgxO4 with K2NiF4 structure type", "Solid State Ionics", Nov. 2002, pp. 365-370, vol. 151.

Mawdsley, J., et al., "Electrode Materials Development for High Temperature Steam Electrolysis", "211th Electrochemical Society (ECS) Meeting Abstract", May 6-10, 2007, p. 1 Published in: Chicago, IL.

Mehta, K., et al., "Two-Layer Fuel Cell Electrolyte Structure by Sol-Gel Processing", "Journal of Sol-Gel Science and Technology", Jul. 1998, pp. 203-207, vol. 11.

Meng, X., et al., "Characterization of Pr1-xSrxCo0.8Fe0.2O3-omega(0.2 less than equal to x less than equal to 0.6) cathode materials for intermediate-temperature solid oxide fuel cells", "Journal of Power Sources", May 27, 2008, p. 581-585, vol. 183.

Muecke, R., et al., "Cofiring of Thin Zirconia Films During SOFC Manufacturing", "J. Am. Ceram. Soc.", Oct. 13, 2008, pp. S95S102, vol. 92.

Ni, M., et al., "Technological development of hydrogen production by solid oxide electrolyzer cell (SOEC)", "International Journal of Hydrogen Energy", Apr. 9, 2008, pp. 2337-2354, vol. 33.

Nishimoto, S., et al., "Properties of La1-xPrxNiO4 cathode for intermediate-temperature solid oxide fuel cells", "Journal of the Ceramic Society of Japan", Mar. 1, 2011, pp. 246-250, vol. 119, No. 3.

O'Brien, J., et al., "High-temperature electrolysis for large-scale hydrogen and syngas production from nuclear energy-summary of system simulation and economic analyses", "International Journal of Hydrogen Energy", Oct. 1, 2009, pp. 4808-4819, vol. 35.

Ried, P., et al., "Processing of YSZ screen printing pastes and the characterization of the electrolyte layers for anode supported SOFC", "Journal of the European Ceramic Society", Feb. 14, 2008, pp. 1801-1808, vol. 28.

Shin, Y., et al., "Evaluation of the high temperature electrolysis of steam to produce hydrogen", "International Journal of Hydrogen Energy", Nov. 28, 2006, pp. 1486-1491, vol. 32.

Skinner, S., et al., "Oxygen diffusion and surface exchange in La2-xSrxNiO4+omega", "Solid State Ionics", Nov. 2000, pp. 709-712, vol. 135.

Song, J., et al., "Fabrication characteristics of an anodesupported electrolyte fabricated by the tape casting method for ITSOFC", "Journal of Materials Processing Technology", Mar. 2008, pp. 414-418, vol. 198.

Sun, W., et al., "NiO+YSZ anode substrate for screen-printing fabrication of YSZ electrolyte film in solid oxide fuel cell", "Journal of Physics and Chemistry of Solids", Jan. 2009, pp. 164-168, vol. 70.

Taillades, G., et al., "Intermediate Temperature Anode-Supported Fuel Cell Based on BaCe0.9Y0.1O3 Electrolyte with Novel Pr2NiO4 Cathode", "Fuel Cells", Oct. 1, 2009, pp. 166-173, vol. 10, No. 1.

Wang, Z., et al., "Improvement of anode-supported solid oxide fuel cells", "Solid State Ionics", Sep. 30, 2008, pp. 1593-1596, vol. 179.

Will, J., et al., "Fabrication of thin electrolytes for second-generation solid oxide fuel cells", "Solid State Ionics", Jun. 1, 2000, pp. 79-96, vol. 131.

Zhang, X., et al., "NiO-YSZ cermets supported low temperature solid oxide fuel cells", "Journal of Power Sources", May 6, 2006, pp. 301-307, vol. 161.

\* cited by examiner

METHOD OF PREPARING AN ELECTROCHEMICAL HALF-CELL

CROSS-REFERENCE TO RELATED APPLICATIONS

This application is a U.S. national phase under the provisions of 35 U.S.C. §371 of International Patent Application No. PCT/EP12/57117 filed Apr. 19, 2012, which in turn claims priority of French Patent Application No. 1153522 filed Apr. 22, 2011. The disclosures of such international patent application and French priority patent application are hereby incorporated herein by reference in their respective entireties, for all purposes.

TECHNICAL FIELD

The present invention belongs to the field of new energy technologies offering devices and methods to promote renewable energies and limit greenhouse gas emissions.

More specifically, the present invention belongs to the field of high-temperature electrochemical cells, notably electrode-supported cells, and, in particular, to the field of solid oxide fuel cells (SOFC) and solid oxide electrolysis cells (SOEC).

Indeed, the present invention offers a method of preparing an electrochemical half-cell combining a porous electrode and a thin, dense electrolyte, and involving a single step of sintering at a temperature of less than or equal to 1350° C.

STATE OF THE PRIOR ART

Various work relates to the production of electrolyte films on massive electrodes in order to prepare second-generation electrochemical electrode-supported cells.

The deposition methods reported in the literature may be divided into two major families: approaches called "physical approaches", such as thermal spraying or deposition by pulsed laser deposition, and approaches called "wet approaches, such as tape casting, screen printing, or again deposition by electrophoresis. However, only the latter family uses simple, low-cost techniques of industrial application. The bibliography shown hereinafter concentrates on this second family.

Different authors report production of electrolyte coatings on a support anode by screen printing. An ink consisting of powder and a carrier fluid which may contain solvents, dispersing agents, binders and/or plasticisers is prepared and subsequently deposited by screen printing on an electrode.

In certain cases the electrodes, which are shaped by pressing or tape casting, are pre-sintered at an intermediate temperature (1000-1200° C.), the "electrode-electrolyte" assembly then being sintered at a higher temperature (>1350° C.) to obtain dense electrolytes of 7 to 20 μm [1-5].

Hansch et al. modify the composition of the ink by adding sol (Sol-Gel precursors) thereto [6]. In this article the ink consists of a carrier fluid, particles of powder and sol-gel precursors, which allows dense yttrium stabilized zirconia (YSZ) electrolytes to be prepared which are 20 μm thick after high-temperature sintering (1400° C.).

In the case of electrodes shaped by tape casting, and production of half-cells by screen printing of a suspension comprising a powder and a carrier fluid, a single heat treatment may be used in certain cases. Thus, Zhang et al. describe the preparation of dense $Sm_{0.2}Ce_{0.8}O_{1.9}$ (SDC) coatings which are approximately 15 μm thick after sintering at 1400° C. on a green anode produced by tape casting [7].

It should be noted that, in this article, the temperature used is a high temperature, and that the deposited ink is not a gel but rather a suspension.

Other deposition techniques may be used in preparing electrochemical half-cells.

In the case of tape co-casting the anode is prepared by tape casting and the electrolyte is "co-cast". The slurry which is cast consists of powder, solvent, dispersing agent, binder and plasticiser. The assembly is then co-sintered at a high temperature, of over 1350° C. Indeed, a lower temperature does not enable a dense electrolyte to be obtained. Different authors describe the production of dense electrolytes 10 to 30 μm thick after heat treatment at temperatures of over 1350° C. [8-10].

The lamination method is the same as the co-casting, but an additional step is introduced: lamination of the green tape. Thus, Song et al. obtain an electrolyte of 10 μm after co-sintering at 1350° C. [11].

Deposition by electrophoresis consists in depositing a powder in suspension, on the pre-sintered anode, by application of an electrical field. Hosomi et al. produce dense coatings of YSZ 3 to 15 μm thick, depending on the time and the applied voltage, after heat treatment at 1350° C. [12].

For spray-coating, a powder in suspension is deposited, on the pre-sintered anode, by spraying. Various authors have prepared dense electrolytes of YSZ 15 to 45 μm thick after high-temperature sintering (1400° C.) [13, 14].

De Souza et al. use the deposition of colloidal suspensions [1,5]. Ultra-fine powder is dispersed in a solvent and then deposited on a pre-sintered anode. Dense electrolytes of YSZ 9 μm thick are obtained after high-temperature sintering (1400° C.).

Other authors use sol (Sol-Gel). The slurry then consists of a fluid, particles of powder and sol gel precursors. By dip-coating, Lenormand et al. report the preparation of dense electrolytes of YSZ of 20 μm after high-temperature sintering (1400° C.) [16].

Thin electrolyte films less than 1 or 2 μm thick have previously been prepared. Indeed, methods such as spin-coating [1,7], dip-coating or ALD (atomic layer deposition) [18] allow the production of coatings several nanometers (<2 μm) thick of dense YSZ at lower temperatures (800-1250° C.). Precursors in solution are deposited on a pre-sintered electrode before final heat treatment. These techniques therefore require two heat treatments.

A major obstacle to the development of high-temperature electrochemical cells, notably those made from stabilised zirconia, in the support electrode design ($2^{nd}$ generation), lies in the manufacturing cost associated with thermal sintering treatments. Indeed, production of cathode//electrolyte//anode cells requires, generally and as previously described, three heat treatments (one per element), and notably a high-temperature sintering treatment (≥1400° C.) in order to obtain a dense electrolyte which is impermeable to gases.

Industrially, the large-scale production of electrode//electrolyte half-cells involves the use of high-temperature continuous furnaces operating at over 1400° C. The consumable refractories then used are carbides such as silicon carbides, which are expensive. By lowering the sintering temperature, for example to 1200° C., these refractories may be replaced by alumina refractories, which are much less expensive. In addition, by reducing the number of heat treatments by changing, in the case of a half-cell, from two treatments to a single treatment, production costs and times are greatly reduced.

The inventors therefore set themselves the aim of developing a method for preparing an electrode-supported electrochemical half-cell requiring fewer sintering steps and lower sintering temperatures.

DESCRIPTION OF THE INVENTION

The present invention enables the technical problems as previously defined to be resolved, and the aim set by the inventors to be attained.

Indeed, the inventors' work has enabled a method for preparing an electrode-supported electrochemical half-cell to be developed, comprising a single step of heat treatment, in order to co-sinter both the electrode and the electrolyte, at a temperature of below 1350° C., without prior sintering of the electrode. It is therefore possible to speak of a low-temperature mono-sintering method of shaping of an electrochemical half-cell.

The method of the invention brings two elements into line, namely: a green support electrode such as a green support composite and a gel or a sol which is a precursor of the electrolyte. The absence of pre-sintering of the support, and the use of a very reactive gel or sol as the precursor of the electrolyte, enable a single heat treatment to be used, at a lower temperature, where the other techniques often require pre-sintering and/or high-temperature treatments, generally relating to the use of a powder in suspension to produce the electrolyte. Due to this method of implementation, it is thus possible to reduce the manufacturing times and costs with a view to industrialisation. In addition, the sol-gel approach allows great flexibility, and phases of high purity to be obtained, and also the possibility of obtaining oxides with complex formulations (multi-cations) at lower temperature than with conventional synthesis/deposition approaches.

More particularly, the present invention relates to a method for preparing an electrode-supported electrochemical half-cell including a step consisting in subjecting a green electrode layer on which a precursor gel of the electrolyte or a precursor thereof is deposited to sintering at a temperature of less than or equal to 1350° C.

As a reminder, an electrochemical cell involves the combined use of at least two electrodes and at least one electrolyte, and notably comprises two electrodes and one electrolyte. An electrochemical half-cell thus involves the combined use of at least one electrode and at least one electrolyte, and notably comprises one electrode and one electrolyte. The different elements constituting the electrochemical (half-)cell take the form of appreciably parallel layers, applied one on top of the other. In the context of the present invention, the electrochemical half-cell advantageously consists of an electrode of the support electrode type and of an electrolyte.

The term "green electrode layer" is understood to mean a layer of electrode not having been subjected to any step of sintering or of heat treatment following its deposition and, prior to the deposition, on its surface, of the precursor gel of the electrolyte or of the precursor thereof. As explained above, the only sintering treatment to which the green electrode layer is subjected is the step of co-sintering, to which the precursor gel of the electrolyte or the precursor thereof is simultaneously subjected.

The green electrode layer used in the context of the present invention is obtained from a ceramic ink, also designated by the term "slurry". Such a ceramic ink is a dispersion (or suspension) of powders of electrode material in an aqueous or organic fluid.

Any powder of an electrode material known to those skilled in the art may be used in preparing the ceramic ink used in the context of the present invention. Said powder may thus be a powder of a material chosen from among the perovskite materials of structure $ABO_3$, where A represents a rare earth such as a lanthanum and B a transition metal; compounds of formula $Ln_2NiO_{4+y}$, where Ln represents a lanthanide and, in particular, La, Nd and Pr; germanates of formula $La_{10-x}Ge_6O_{26+y}$; silicates of formula $La_{10-x}Si_6O_{26+y}$; stabilised zirconias, possibly blended with NiO; substituted cerias, possibly blended with NiO, and blends thereof. More particularly, said powder may be a powder of a material chosen from among the stabilised zirconias, possibly blended with NiO; the substituted cerias, possibly blended with NiO, and blends thereof.

The term "stabilised zirconia" is understood to mean a zirconia which has been stabilised or substituted by a metal oxide, and notably an oxide of a metal chosen from among yttrium, cerium, scandium, ytterbium, aluminium and calcium. The expressions "stabilised zirconia", "substituted zirconia" and "doped zirconia" are equivalent and may be used interchangeably. The stabilised zirconia may be used in a blend with NiO. In this case the powder used in the ceramic ink is a blend of powdered NiO and of powdered stabilised zirconia, such as powdered YSZ. The term "an electrode of the NiO/stabilised zirconia type" is used. In such a blend the quantity of stabilised zirconia expressed as a mass relative to the total mass of the blend (NiO+stabilised zirconia) is between 20 and 60%, notably 30 and 50% and, in particular, of the order of 40% (i.e. 40%±5%).

The term "substituted ceria" is understood to mean a substituted or doped ceria, and notably made from ceria substituted by a metal oxide and notably an oxide of a metal chosen from among yttrium, gadolinium, calcium, samarium, scandium, aluminium, lanthanum and neodymium. The expressions "substituted ceria", "stabilised ceria" and "doped ceria" are equivalent and may be used interchangeably. The substituted ceria may be used in a blend with NiO. In this case, the powder used in the ceramic ink is a blend of powdered NiO and of powdered substituted ceria, such as powdered GDC. The term "an electrode of the NiO/substituted ceria type" is used. In such a blend the quantity of substituted ceria expressed as a mass relative to the total mass of the blend (NiO+substituted ceria) is between 20 and 60%, notably 30 and 50% and, in particular, of the order of 40% (i.e. 40%±5%).

Whatever the electrode material used the powder of said material is present in a quantity of between 10 and 90% by weight, and notably between 20 and 80% by weight, relative to the total weight of the ceramic ink used.

Any ink powder composition known to those skilled in the art may be used in preparing the ceramic ink used in the context of the present invention. Said ceramic ink thus includes at least one element chosen from among a solvent, a dispersing agent, a binder, a plasticiser and a pore-forming agent.

In the context of the present invention the carrier solvent/fluid is the vehicle for the dispersion of powders of the electrode material. This may be an organic solvent, a blend of organic solvents, water or a blend of water and organic solvent(s). The term "organic solvent" is understood to mean, in the context of the present invention, a solvent belonging to the family of ketones, oxide ethers, esters, alcohols or hydrocarbons, notably aromatic hydrocarbons, or terpenes. Concerning organic solvents which may be used in the context of the present invention, the following may be cited: methyl ethyl ketone (MEK or butanone), acetone, butyl acetate, ethyl glycol, ethanol, toluene, cyclohexanone, butyl carbitol acetate, terpineol and blends thereof such as an azeotropic blend of MEK and ethanol. The organic solvent most particularly used, notably in the context of an electrode material of the NiO/stabilised zirconia type, is the azeotropic blend of MEK and ethanol. The quantity of solvent in the ceramic ink is between 10% and 50% by weight, and notably between 20% and 40% by weight relative to the total weight of said ceramic ink.

A dispersing agent may be used in the ceramic ink composition to improve the stability of the suspension, to prevent the agglomeration of the powders contained in this suspension and, consequently, to obtain a uniform layer. Any dispersing agent known to those skilled in the art may be used in the ceramic ink composition used in the present invention. The dispersing agents which may advantageously be used are chosen from among oleic acid, phosphate esters, polyvinyl butyrate, glycerol trioleate and blends thereof. The dispersing agent most particularly used, notably in the context of an electrode material of the NiO/stabilised zirconia type, is the ester phosphate CP213 sold by Cerampilot. The quantity of dispersing agent in the ceramic ink is between 0.1% and 5% by weight, and notably between 0.5% and 2% by weight relative to the total weight of said ceramic ink.

In the ceramic ink composition, the binder acts to improve its coherence when it has been deposited, and to increase its density by creating organic bridges between the particles constituting it. Any binder known to those skilled in the art may be used in the ceramic ink composition used in the present invention. The binders which may advantageously be used are chosen from among polypropylene carbonate, polyvinyl butyral (PVB), poly(isobutyl methacrylate), poly (vinyl chloride-co-vinyl acetate) (PVCAc), ethylcellulose and blends thereof. The binder most particularly used, notably in the context of an electrode material of the NiO/stabilised zirconia type, is polyvinyl butyral (PVB). The quantity of binder in the ceramic ink is between 1% and 20% by weight, and notably between 2% and 10% by weight relative to the total weight of said ceramic ink.

The ceramic ink composition may also include a plasticiser, the role of which consists in improving the flexibility of the ceramic ink when it has been deposited, and therefore its spreading over the substrate. Any plasticiser known to those skilled in the art may be used in the ceramic ink composition used in the present invention. The plasticisers which may advantageously be used are chosen from among the glycols such as polyethylene glycol (PEG); the phthalates such as butyl and benzyl phthalate (BBP), dibutyl phthalate (DBP) and dioctyl phthalate (DOP); and blends thereof. The plasticisers most particularly used, notably in the context of an electrode material of the NiO/stabilised zirconia type, are dibutyl phthalate (DBP) and polyethylene glycol (PEG). The quantity of plasticiser in the ceramic ink is between 1% and 20% by weight, and notably between 2% and 10% by weight relative to the total weight of said ceramic ink.

Finally, the ceramic ink composition may include a pore-forming agent, where the latter contributes to the final porosity of the electrode prepared according to the method of the invention. In particular, the pore-forming agent enables an open porosity to be created. The term "open porosity" is understood to mean that the pores created in the material are joined and emerge in a free surface. This pore-forming agent is eliminated during the step of co-sintering of the method according to the invention. The pore-forming agent used in the present invention is advantageously in powder form. This pore-forming agent may be any pore-forming agent known to those skilled in the art. This is advantageously a powdery compound, whether or not natural, chosen from among acetylene black, polystyrene, polymethylmethacrylate (PMMA), starch, a polyethylene, a cyclodextrin, a wax, a monosaccharide, an oligosaccharide such as saccharose, a polysaccharide or one of their blends. The quantity of pore-forming agent in the ceramic ink is between 1% and 10% by weight, and notably between 2% and 7% by weight relative to the total weight of said ceramic ink.

It should be observed that the organic blend constituting the ceramic ink may be adjusted according to the particle size and the surface specific area of the ceramic powders used.

During the preparation of the ceramic ink implemented in the context of the invention, when the blend of the different elements constituting it has been produced and homogenised, the latter may be subjected to deaeration.

The precursor of the electrolyte used in the context of the present invention takes the form of a gel or a precursor thereof. The term "precursor thereof" is understood to mean a precursor of the gel i.e. a sol. A sol is defined as a suspension of a colloidal or polymer nature in a solvent, whereas a gel is defined as a solid network enclosing the solvent.

The metal elements required to prepare the electrolyte contribute, in the sol, to constituting the colloidal or polymer network; they are therefore distributed uniformly in the medium during the sol-gel transition. The gel consists of an oxide network swollen by the solvent, with chemical bonds providing the mechanical cohesion of the material, giving it a rigid character. In most cases covalent chemical bonds are used to form the gel network, but it can happen that this network uses weaker chemical bonds, such as dative bonds or hydrogen bonds.

Any technique enabling a sol or a gel to be prepared may be used in the context of the present invention. The gel or its precursor is advantageously prepared using a sol-gel process, using a polymer process derived from the Péchini method, or using an NPG (nitrate polyacrylamide gel) process. Depending on the process chosen, the molecular precursors, and notably the metallic precursors involved, are different. All these molecular precursors are however characterised by a capacity to undergo a polymerisation reaction in a solvent. In addition, whatever synthesis process is used, the metallic cations are distributed uniformly in an organic matrix.

The sol-gel process uses at least one organometallic precursor and notably at least one metallic alkoxide of formula $M(OR)n$, in which M designates a metal and OR an alkoxy group, where R is an alkyl chain, whether linear or branched, having 1 to 15 carbon atoms, and notably 1 to 10 carbon atoms and, in particular, 1 to 5 carbon atoms. The goal of the sol-gel process is to form either an inorganic polymer, or colloids of variable sizes, by hydrocondensation of the alkoxide precursors. The process of hydrocondensation of these precursors leads to the formation of a gel. This gel consists of a M-O-M network enclosing the solvent, with chemical bonds providing the mechanical cohesion of the material.

A metallic alkoxide advantageously used in the context of the present invention is an alkoxide of formula $M(OR)n$ as previously defined, in which M represents zirconium or cerium. The following may be cited as more particular examples: zirconium methoxide, zirconium ethoxide, zirconium n-propoxide, zirconium butoxide, zirconium pentoxide, cerium methoxide, cerium ethoxide, cerium n-propoxide, cerium butoxide and cerium pentoxide. It is clear that the electrolyte obtained from such organometallic precursors is a zirconia or a ceria.

If the electrolyte to be prepared is a substituted zirconia or a substituted ceria as previously defined, the solvent including at least one of the metallic alkoxides as previously defined also includes a salt of a metal capable of replacing the zirconia or the ceria. Such a salt is notably chosen from among a nitrate, a hydroxide, an oxalate, an acetate, a carbonate or an acetylacetonate. More specifically, if a substituted zirconia is used, the salt used is a nitrate, and notably yttrium nitrate.

The solvent advantageously used in the sol-gel process is chosen from among an alcohol, such as methanol, ethanol or n-propanol; an ether, such as diethylether and tetrahydrofurane; a chlorinated solvent, such as chloroform, $CH_2Cl_2$, $C_2H_5Cl_2$; an aprotic solvent such as acetone, acetylacetone, $CH_3CN$, methylethylcetone, or dioxane; a protic solvent such as acetic acid or formamide; one of their blends. A blend of solvents which may be used is a blend of n-propanol and acetylacetone.

The polymer process derived from the Péchini method is based on the method described in U.S. Pat. No. 3,330,697 [19]. In this technique the precursors used are metallic precursors of the metallic salt type in the presence of compounds capable of providing an organic matrix.

More specifically, in the polymer process derived from the Péchini method, the metallic salt(s) is/are dissolved in an organic solution including at least one polymerising agent, at least one complexing agent and one solvent such as water, deionised water or acetic acid. The metallic salt(s) is/are notably chosen from among a nitrate, a hydroxide, an oxalate, an acetate, a carbonate or an acetylacetonate. As an example of a preparation of an electrolyte made of YSZ by the polymer process derived from the Péchini method, the two salts used are yttrium nitrate and zirconium nitrate. The polymerising agent is notably chosen from among hexamethylenetetramine and ethylene glycol, and the complexing agent from among acetylacetone (notably when the polymerising agent is hexamethylenetetramine) and citric acid (notably when the polymerising agent is ethylene glycol).

The NPG (nitrate polyacrylamide gel) synthesis process is notably based on the work described in the article of Magrez et al., 2002 [20] and in the article of Chesnaud et al., 2004 [21].

In this technique the metallic precursors taking the form of metallic salts are dissolved and blended in required proportions in an acidic medium, for example in the presence of nitric acid. The precursors may be carbonates, nitrates, oxides, acetates, oxalates, acetylacetonates or again hydroxides. To prevent any precipitation, the precursors in aqueous solution are complexed by means of, for example, of citric acid. Adjustment of the pH through the addition of a base such as ammonium hydroxide may also be required. The solution obtained, containing the precursors, is maintained at a temperature of ~200° C. whilst stirring in order to reduce its volume. The addition of a monomer such as acrylic acid and of a cross-linking agent such as N—N' Methylene Bis Acrylamide (MBA) allows the gel to be formed. Gelification may be initiated thermally or through the addition of $H_2O_2$ or any other compound allowing free radicals to be created.

In the context of the method according to the present invention, the sintering or co-sintering temperature is advantageously between 1000 and 1350° C., and notably between 1000 and 1300° C.

Prior to the sintering step, the green electrode layer on which a precursor gel of the electrolyte or a precursor thereof is deposited is at a temperature of between 10 and 40° C., notably between 18 and 30° C., and advantageously at ambient temperature. The term "ambient temperature" is understood to mean, in the context of the present invention, a temperature of 25 C±5° C.

Before being brought to the sintering temperature, the green electrode layer on which a precursor gel of the electrode or a precursor thereof is deposited is brought to an intermediate temperature of between 400 and 800° C., notably between 500 and 700° C. and, in particular, of the order of 600° C. (i.e. 600° C.±50° C.). The green electrode layer on which a precursor gel of the electrolyte or a precursor thereof is deposited is maintained at this intermediate temperature for a period of between 15 and 120 min, notably between 30 and 90 min and, in particular, of the order of 60 min (i.e. 60 min±15 min). The green electrode layer on which a precursor gel of the electrode or a precursor thereof is deposited is brought to an intermediate temperature by means of a slow rising temperature gradient of between 10 and 50° C./h, notably between 15 and 40° C./h and, in particular, of the order of 25° C./h (i.e. 25° C./h±5° C./h). This slow rise in temperature allows the organic elements to be slowly evacuated, and also allows the precursor elements of the electrolyte to crystallise.

The green electrode layer on which a precursor gel of the electrode or a precursor thereof is deposited is brought from the intermediate temperature to the sintering temperature by means of a rising temperature gradient which may be faster, and advantageously of between 25 and 100° C./h, notably between 35 and 75° C./h and, in particular, of the order of 50° C./h (i.e. 50° C./h±10° C./h). The green electrode layer on which a precursor gel of the electrolyte or a precursor thereof is deposited is then maintained at the sintering temperature for a period of between 1 and 5 h, notably between 2 and 4 h and, in particular, of the order of 3 h (i.e. 3 h±30 min.).

Finally, following the sintering step, the material obtained from the green electrode layer on which a precursor gel of the electrolyte or a precursor thereof is located is brought back down to a temperature of between 10 and 40° C., notably between 18 and 30° C., and advantageously to ambient temperature. The layer is brought from the sintering temperature to this temperature by means of a cooling temperature gradient of between 40 and 300° C./h, notably between 60 and 150° C./h and, in particular, of the order of 100° C./h (i.e. 100° C./h±25° C./h).

The sintering step and the steps of rise in temperature and of cooling may be implemented in a programmable furnace such as a continuous pushed-batt kiln, a roller-hearth kiln, a tunnel furnace with tubs, a static furnace, a chamber setting or a removable cover furnace. The size of the furnace will be chosen such that it is suitable for the size of the electrochemical half-cell to be prepared.

The step of sintering and the steps of rising temperature and of cooling are advantageously implemented in air.

More specifically, the method according to the present invention includes the steps consisting of:

a) preparing a layer of green electrode notably as defined above;

b) depositing, on said green electrode layer, a precursor gel of the electrolyte or a precursor thereof, notably as defined above and c) subjecting said green electrode layer on which said precursor gel of the electrolyte or a precursor thereof is deposited to a sintering temperature as defined above.

During step (a) of the method according to the present invention, the green electrode layer is obtained by deposition of a ceramic ink as defined above. As particular examples of deposition techniques which may be used to deposit the ceramic ink, the following may be cited: screen printing, tape casting, dip-spinning or dip-coating. In step (a), the deposition is advantageously accomplished by tape casting.

The green electrode layer obtained following step (a) of the method according to the invention is advantageously between 50 µm and 2 mm thick, and notably between 100 µm and 1 mm thick.

When the green electrode layer has been deposited it may be dried. Any drying technique known to those skilled in the art may be used in the context of the present invention. This drying may be a thermal drying, typically by subjecting the green electrode layer to a temperature of between 30 to 180° C., notably between 70 to 160° C. and, in particular, to a temperature of the order of 140° C. (i.e. 140° C.±10° C.) for a period of between 3 and 45 min, notably between 5 and 30 min and, in particular, for 15 min as a variant, the drying may consist of a simple evaporation of the solvents.

In addition, when the green electrode layer has been deposited, and optionally dried, it may be cut to the desired dimensions, taking account of the shrinkage during sintering.

As particular examples of deposition techniques which may be used to deposit the precursor gel of the electrolyte or a precursor thereof on the green electrode layer, the following may be cited: screen printing, tape casting, dip-spinning or dip-coating. In step (b), the deposition is advantageously accomplished by screen printing.

The layer corresponding to the precursor gel of the electrolyte is between 1 and 50 µm thick, notably between 2 and 30 µm thick, in particular between 3 and 20 µm thick and, very particularly, between 4 and 10 µm thick.

Following the sintering step (c) of the method according to the present invention, the sintered material obtained from the electrode layer on which said precursor gel of the electrolyte or a precursor thereof is deposited may be subjected to a reduction. Such a reduction is particularly necessary when the electrode is made of a material including NiO, such as a material of the NiO/stabilised zirconia or NiO/substituted ceria type. The reduction enables a cermet of the Ni/stabilised zirconia or Ni/substituted ceria type, respectively, to be obtained from such materials. This reduction is accomplished at a temperature of between 600 and 1000° C. for 2 to 10 hours, and more particularly at 750° C. for 3 h, in a reducing atmosphere, for example in an AR/H2 (4%) stream.

When the method according to the present invention has been accomplished, an electrochemical half-cell having a porous support electrode and a thin, dense electrolyte is obtained. The present invention therefore relates to a method as defined above, in which the electrode-supported electrochemical half-cell obtained following the step of sintering and/or following the step of reduction as defined above has a porous support electrode and a thin, dense electrolyte. In other words, the present invention relates to the use of a method as defined above in order to prepare an electrode-supported electrochemical half-cell having a porous support electrode and a thin, dense electrolyte.

The term "porous electrode" is understood to mean an electrode with open porosity, i.e. an electrode in which the pores created are joined. The porous electrode obtained advantageously has an open porosity of between 20 and 70% by volume, and notably between 30 and 60% by volume, relative to the total volume of the electrode.

The term "dense electrolyte" is understood to mean an electrolyte the porosity of which is less than 10% by volume, notably less than 7% by volume and, in particular, less than 6% by volume, relative to the total volume of the electrolyte.

The term "thin electrolyte" is understood to mean an electrolyte between 1 and 50 µm thick, notably between 2 and 30 µm thick, in particular between 3 and 20 µm thick and, very particularly, between 4 and 10 µm thick.

The present invention also relates to an electrochemical half-cell obtained directly through use of the method as defined above.

Other characteristics and advantages of the present invention will also occur to those skilled in the art on reading the example given below, as an illustration only, and not restrictively, with reference to the appended figures, and relating to the implementation of an SOFC (or SOEC) half-cell of the anode-supported type (or respectively cathode-supported type), incorporating a NiO/8YSZ composite electrode and an 8YSZ electrolyte.

BRIEF DESCRIPTION OF THE ILLUSTRATIONS

FIG. 2 shows two micrographs in secondary electron mode of the fracture surface of the electrochemical half-cell (NiO/8YSZ//8YSZ) heat treated at 1200° C. for 3 h in accordance with the method of the invention.

DETAILED DESCRIPTION OF PARTICULAR EMBODIMENTS

I. Preparation of a Green Tape of Composite NiO/8YSZ.

Production of a electrode-supported electrochemical cell according to the invention involves, initially, the production of a green tape of composite NiO/8YSZ. It is produced by tape casting of a slurry.

This suspension consists of a powdery blend of 60% by mass of NiO and 40% of 8YSZ constituting 69% of the final mass of the slurry, of CP213 constituting 0.6% by mass, of a blend of MEK and of ethanol constituting 23% by mass, of PVB constituting 3.4% by mass and of PEG constituting 4% by mass.

When the tape has been produced and dried for 24 h at 20° C. it is cut into the required electrode shapes and dimensions, taking account of shrinkage during sintering.

II. Preparation of Electrolyte 8YSZ.

In the case of an electrolyte 8YSZ, a sol obtained from a system involving zirconium n-propoxide, yttrium nitrate, acetylacetone (acac.), n-propanol and water was used. The synthesis parameters chosen for the sol are:

concentration: C=[Zr]=0.5 mol·L$^{-1}$
complexing rate R'
where R'=[acac.]/([Zr]+[Y])=0.7
hydrolysis rate W'
where W'=[H$_2$O]/([Zr]+[Y])=10.

The yttrium precursor was dissolved in 1-propanol at a concentration of 1 mol·L$^{-1}$. The zirconium n-propoxide is introduced in the 1-propanol/acac blend whilst it is being stirred. Yttrium nitrate dissolved in 1-propanol and water is then added.

Under these synthesis conditions, the sol consists of colloidal particles created at the start of the hydrolysis and condensation reactions. The elementary particles, moving randomly, aggregate when they come into contact with one another. This mechanism continues and leads to the formation of objects (aggregates), which themselves diffuse and aggregate. This is the step of gelification or sol-gel transition. When this process of aggregation is finished the gel is obtained. It is this which was deposited on the surface of the green tape of NiO/8YSZ (FIG. 1) by means of a screen printing machine.

Figure 1:
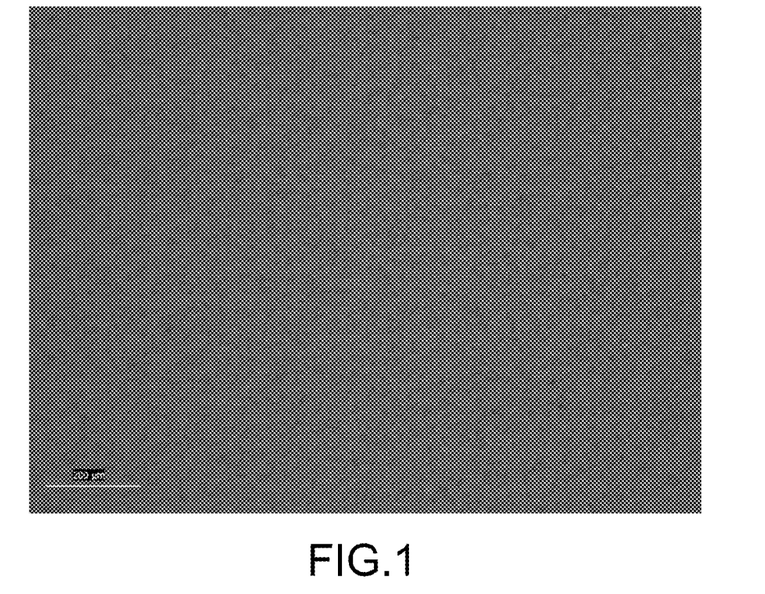
FIG. 1 is a micrograph obtained by optical microscopy of a green electrode tape as implemented in the present invention.

As shown by the photograph of the surface of the green tape in FIG. 1, the impermeable microstructure of this tape (polymer+powder) enables penetration of the sol or the gel into the final microstructure of the electrode to be prevented.

III. Heat Treatment.

When the gel has been deposited the [tape+gel] system is heat treated to give sufficient mechanical properties to the support electrode and to densify the electrolyte. The thermal cycle used in this example is as follows:

25° C.→25° C./h→600° C./1h→50° C./h→1200° C./3h→100° C./h→25° C.

A microstructural observation of the fracture surface of the heat treated surface was accomplished by scanning electron microscopy. These observations are presented in FIG. 2.

Figure 2A:
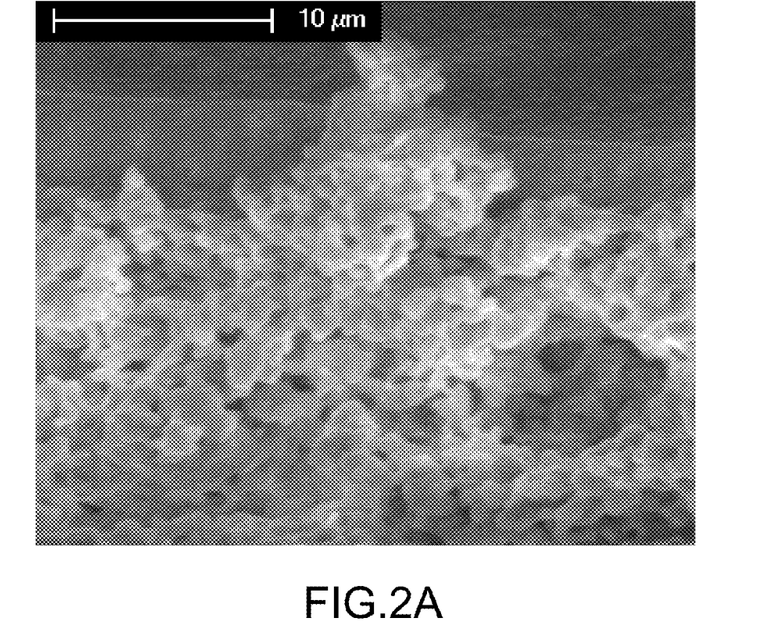
FIGS. 2A and 2B are micrographs of the same fracture surface, taken at two different enlargements.
Figure 2B:
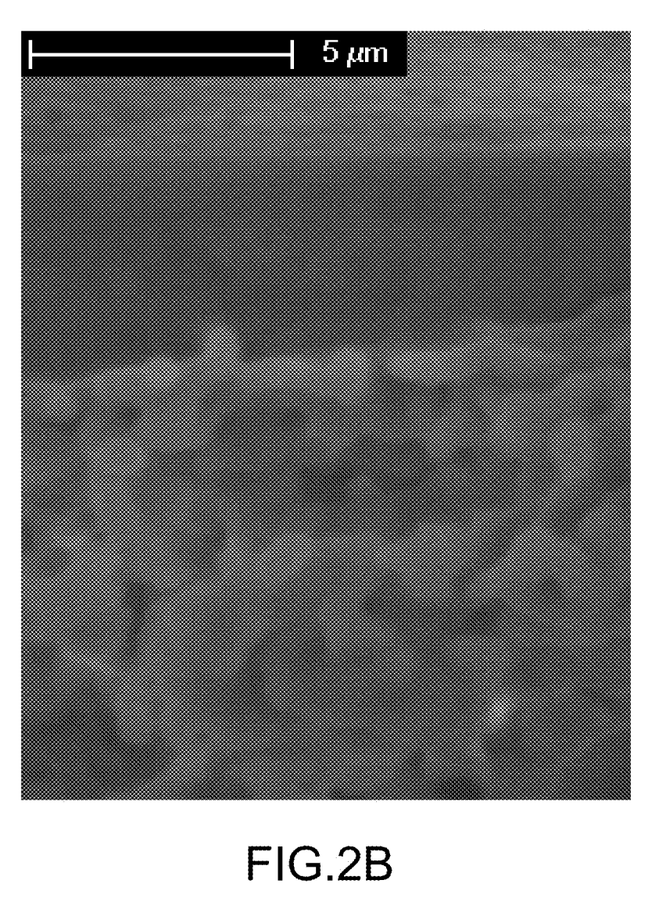

In these micrographs one can see in the upper part the dense electrolyte which is ~5 μm thick, and in the lower part the composite NiO/8YSZ electrode which will lead, by in situ reduction (i.e. when the cell is put into service), to the cermet Ni/8YSZ.

REFERENCES

[1] Ried et al., "Processing of YSZ screen printing pastes and the characterization of the electrolyte layers for anode supported SOFC", Journal of the European Ceramic Society 28 (2008) 1801-1808.
[2] Sun et al., "NiO+YSZ anode substrate for screen-printing fabrication of YSZ electrolyte film in solid oxide fuel cell", Journal of Physics and Chemistry of Solids 70 (2009) 164-168.
[3] Liang et al., "Preparation of NiO—YSZ composite powder by a combustion method and its application for cathode of SOEC", International Journal of Hydrogen Energy 35 (2010) 2852-2857.
[4] Dollen et al., "A Study of Screen Printed Yttria-Stabilized Zirconia Layers for Solid Oxide Fuel Cells", Journal of the American Ceramic Society 88 (2005) 3361-3368.
[5] Mücke et al., "Cofiring of Thin Zirconia Films During SOFC Manufacturing", Journal of the American Ceramic Society 92 (2009) S95-S102.
[6] Hansch et al., "Screen printing of sol-gel-derived electrolytes for solid oxide fuel cell (SOFC) application", Ceramics International 35 (2009) 803-811.
[7] Zhang et al., "NiO—YSZ cermets supported low temperature solid oxide fuel cells", Journal of Power Sources 161 (2006) 301-307.
[8] Wang et al., "Improvement of anode-supported solid oxide fuel cells", Solid State Ionics 179 (2008) 1593-1596.
[9] Doshi et al., "Development of Solid-Oxide Fuel Cells That Operate at 500° C.", Journal of The Electrochemical Society 146 (1999) 1273-1278.
[10] Ihringer et al., Proc. 5th Int. Conf. Solid Oxide Fuel Cells, Electrochemical Society, Pennington, N.J., (1997) 340.
[11] Song et al., "*Fabrication characteristics of an anode-supported thin-film electrolyte fabricated by the tape casting method for IT-SOFC*", Journal of Materials Processing Technology 198 (2008) 414-418.
[12] Hosomi et al., "Electrophoretic deposition for fabrication of YSZ electrolyte film on non-conducting porous NiO—YSZ composite substrate for intermediate temperature SOFC", Journal of the European Ceramic Society 27 (2007) 173-178.
[13] Leng et al., "Performance evaluation of anode-supported solid oxide fuel cells with thin film YSZ electrolyte", International Journal of Hydrogen Energy 29 (2004) 1025-1033.
[14] Ding et al., "An anode-supported solid oxide fuel cell with spray-coated yttria-stabilized zirconia (YSZ) electrolyte film", Solid State Ionics 179 (2008) 1246-1249.
[15] De Souza et al., "Thin-film solid oxide fuel cell with high performance at low temperature", Solid State Ionics 98 (1997) 57-61.
[16] Lenormand et al., "Thick films of YSZ electrolytes by dip-coating process", Journal of the European Ceramic Society 25 (2005) 2643-2646.
[17] Mehta et al., "Two-Layer Fuel Cell Electrolyte Structure by Sol-Gel Processing", Journal of Sol-Gel Science and Technology 11 (1998) 203-207.
[18] Bernay et al., "Yttria-doped zirconia thin films deposited by atomic layer deposition ALD: a structural, morphological and electrical characterisation", Journal of Physics and Chemistry of Solids 64 (2003) 1761-1770.
[19] Brevet U.S. Pat. No. 3,330,697 "Method of preparing lead and alkaline earth titanates and niobates and coating method using the same" in Péchini's name, published on Jul. 11, 1967.
[20] Magrez et al., "A new 'Chimie Douce' approach to the synthesis of $Sr_{1-x}La_{1+x}Al_{1-x}Mg_xO_4$ with $K_2NiF_4$ structure type", International Symposium on Soft processing N° 2 (2002).
[21] Chesnaud et al., "Cuspidine-like compounds $Ln_4[Ga_{2(1-x)}Ge_{2x}O_{7+x}\square_{1-x}]O_2$ (Ln=La, Nd, Gd; x≤0.4)", Chemistry of Materials 16 (2004) 5372-5379.

The invention claimed is:

1. A method for preparing an electrode-supported electrochemical half-cell including a single step of sintering, said step consisting of subjecting a green electrode layer on which a precursor gel of an electrolyte or a sol precursor of said gel is deposited to sintering at a temperature of less than or equal to 1350° C., said gel comprising a solid network wherein metallic cations are uniformly distributed in an organic matrix, and said sol precursor of said gel comprising a colloidal or polymer suspension wherein the metallic cations contribute to forming a colloidal or polymer network, and wherein said green electrode layer is obtained from a ceramic ink corresponding to a dispersion (or suspension) of powders of the electrode material in an aqueous or organic solvent.

2. A method according to claim 1, wherein said powder is a powder of a material chosen from among perovskite materials of structure $ABO_3$, where A represents a rare earth and B a transition metal; stabilised zirconias, optionally blended with NiO; substituted cerias, optionally blended with NiO, and blends thereof.

3. A method according to claim 1, wherein said ceramic ink includes at least one element chosen from among a solvent, a dispersing agent, a binder, a plasticiser and a pore-forming agent.

4. A method according to claim 1, wherein the gel or its sol precursor is prepared by a sol-gel process, by a polymer process derived from the Péchini method, or by an NPG (nitrate polyacrylamide gel) synthesis process.

5. A method according to claim 4, wherein the gel or its sol precursor is prepared by a sol-gel process and said sol-gel process uses at least one organometallic precursor.

6. A method according to claim 5, wherein R has 1 to 10 carbon atoms.

7. A method according claim 1, wherein the sintering temperature is between 1000 and 1350° C., and wherein the green electrode layer on which a precursor gel of the electrolyte or a sol precursor of said gel is deposited is maintained at the sintering temperature for a period of between 1 and 5 h.

8. A method according to claim 7, wherein the sintering temperature is between 1000 and 1300° C.

9. A method according to claim 1, wherein before being brought to the sintering temperature, the green electrode layer on which a precursor gel of the electrolyte or a sol precursor of said gel is brought to an intermediate temperature of between 400 and 800° C. and wherein it is maintained at this intermediate temperature for a period of between 15 and 120 min.

10. A method according to claim 9, wherein said green electrode layer on which a precursor gel of the electrode or a sol precursor of said gel is deposited is brought to an intermediate temperature by means of a slow rising temperature gradient of between 10 and 50° C./h[L].

11. A method according to claim 10, wherein the temperature gradient is between 15 and 40° C./h.

12. A method according to claim 9, wherein said green electrode layer on which a precursor gel of the electrode or a sol precursor of said gel is deposited is brought from the intermediate temperature to the sintering temperature by means of a rising temperature gradient of between 25 and 100° C./h.

13. A method according to claim 9, wherein the intermediate temperature is between 500 and 700° C.

14. A method according to claim 1, including the steps consisting of:
   a) preparing the green electrode layer;
   b) depositing, on said green electrode layer, the precursor gel of the electrolyte or the sol precursor of said gel and
   c) subjecting said green electrode layer on which said precursor gel of the electrolyte or the sol precursor of said gel is deposited to a sintering temperature of less than or equal to 1350° C.

15. A method according to claim 14, wherein, in step (a), the green electrode layer is obtained by deposition of a ceramic ink corresponding to a dispersion (or suspension) of powders of the electrode material in an aqueous or organic solvent by tape casting.

16. A method according to claim 14, wherein, in step (b), the deposition is accomplished by screen printing.

17. A method according to claim 14, wherein, following step (c), the sintered material is subjected to a reduction.

18. A method according to claim 17, wherein the electrode-supported electrochemical half-cell obtained following the step of reduction has a porous support electrode and a thin, dense electrolyte.

19. A method according to claim 1, wherein the electrode-supported electrochemical half-cell obtained following the step of sintering has a porous support electrode and a thin, dense electrolyte.

20. A method according to claim 5, wherein the at least one organometallic precursor comprises at least one metallic alkoxide selected from the group consisting of zirconium methoxide, zirconium ethoxide, zirconium n-propoxide, zirconium butoxide, zirconium pentoxide, cerium methoxide, cerium ethoxide, cerium n-propoxide, cerium butoxide and cerium penoxide.

* * * * *